United States Patent
Hayashi et al.

(10) Patent No.: US 7,630,573 B2
(45) Date of Patent: Dec. 8, 2009

(54) NOISE REDUCTION APPARATUS AND METHOD

(75) Inventors: Kenkichi Hayashi, Asaka (JP); Seiji Tanaka, Asaka (JP); Masaya Tamaru, Asaka (JP); Makoto Ooishi, Asaka (JP); Kazuhiko Takemura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 375 days.

(21) Appl. No.: 11/192,181

(22) Filed: Jul. 29, 2005

(65) Prior Publication Data

US 2006/0029287 A1 Feb. 9, 2006

(30) Foreign Application Priority Data

Aug. 3, 2004 (JP) ............................. 2004-226249

(51) Int. Cl.
*G06K 9/40* (2006.01)
(52) U.S. Cl. ..................................... 382/261; 382/254
(58) Field of Classification Search ................ 382/261, 382/254
See application file for complete search history.

(56) References Cited

U.S. PATENT DOCUMENTS

| | | | | |
|---|---|---|---|---|
| 5,696,850 A | * | 12/1997 | Parulski et al. .............. | 382/261 |
| 6,795,588 B1 | * | 9/2004 | Nio et al. .................... | 382/261 |
| 2002/0126911 A1 | * | 9/2002 | Gindele et al. .............. | 382/254 |
| 2003/0081855 A1 | * | 5/2003 | Dolazza ...................... | 382/261 |
| 2003/0095287 A1 | * | 5/2003 | Miyagi et al. ................ | 358/2.1 |

FOREIGN PATENT DOCUMENTS

| | | |
|---|---|---|
| JP | 4-235472 A | 8/1992 |
| JP | 2002-74356 A | 3/2002 |
| JP | 2004-74793 A | 3/2004 |

* cited by examiner

*Primary Examiner*—Samir A. Ahmed
*Assistant Examiner*—Stephen R Koziol
(74) *Attorney, Agent, or Firm*—Birch, Stewart, Kolasch & Birch, LLP

(57) ABSTRACT

Noise reduction processing in accordance with frequency band is executed. To accomplish this, a image data dividing circuit divides image data into image data having frequencies in a low-frequency region, image data having frequencies in a low- to intermediate frequency region and image data having frequencies in a low- to high-frequency region. These items of image data thus divided on a frequency-band basis are input to respective ones of noise reduction circuits that have been set to respective ones of parameters suited to noise reduction of image data having frequencies in the low-, low- to intermediate and low- to high-frequency regions, respectively. The items of image data that have thus undergone noise reduction processing conforming to frequency band are input to an image data combining circuit. The latter combines the image data so as to obtain image data representing one frame of an image.

8 Claims, 19 Drawing Sheets

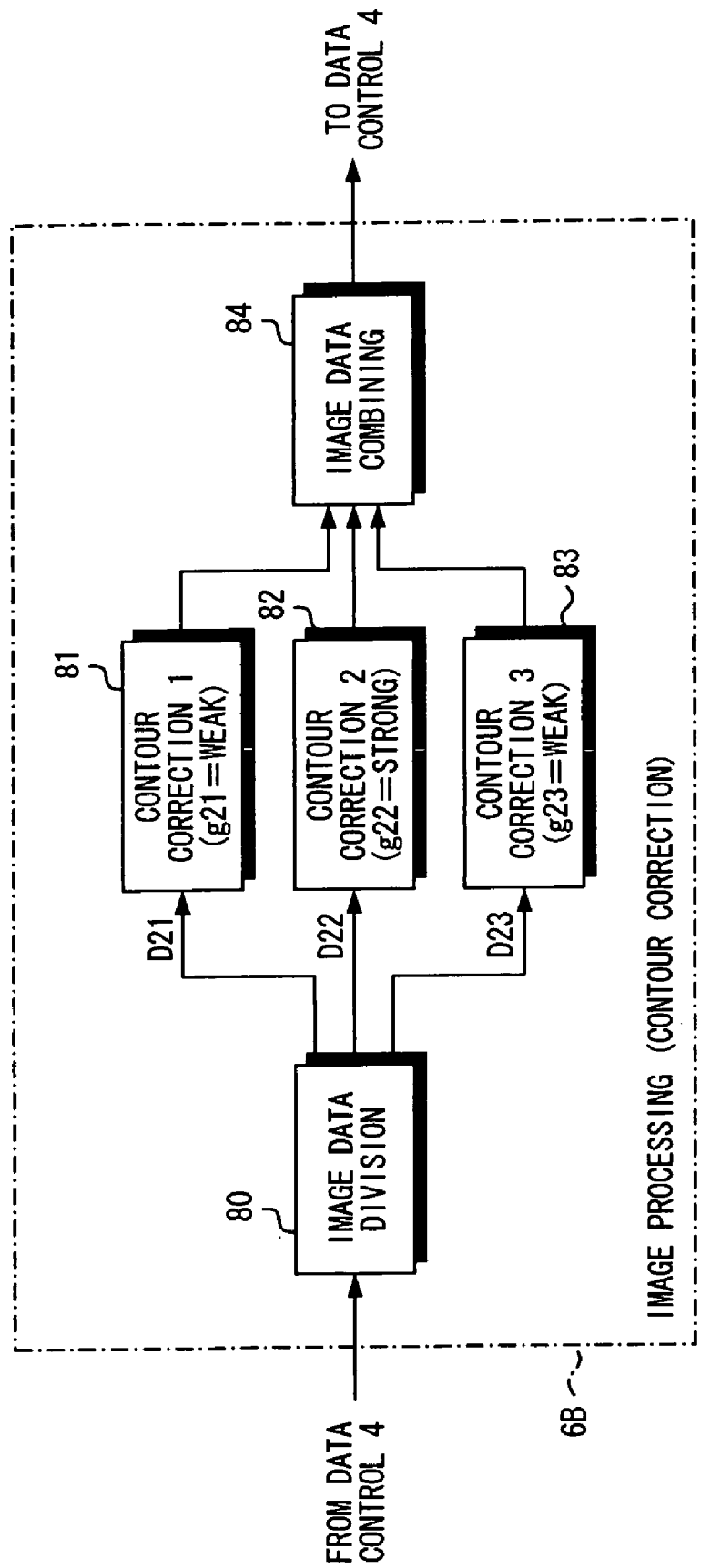

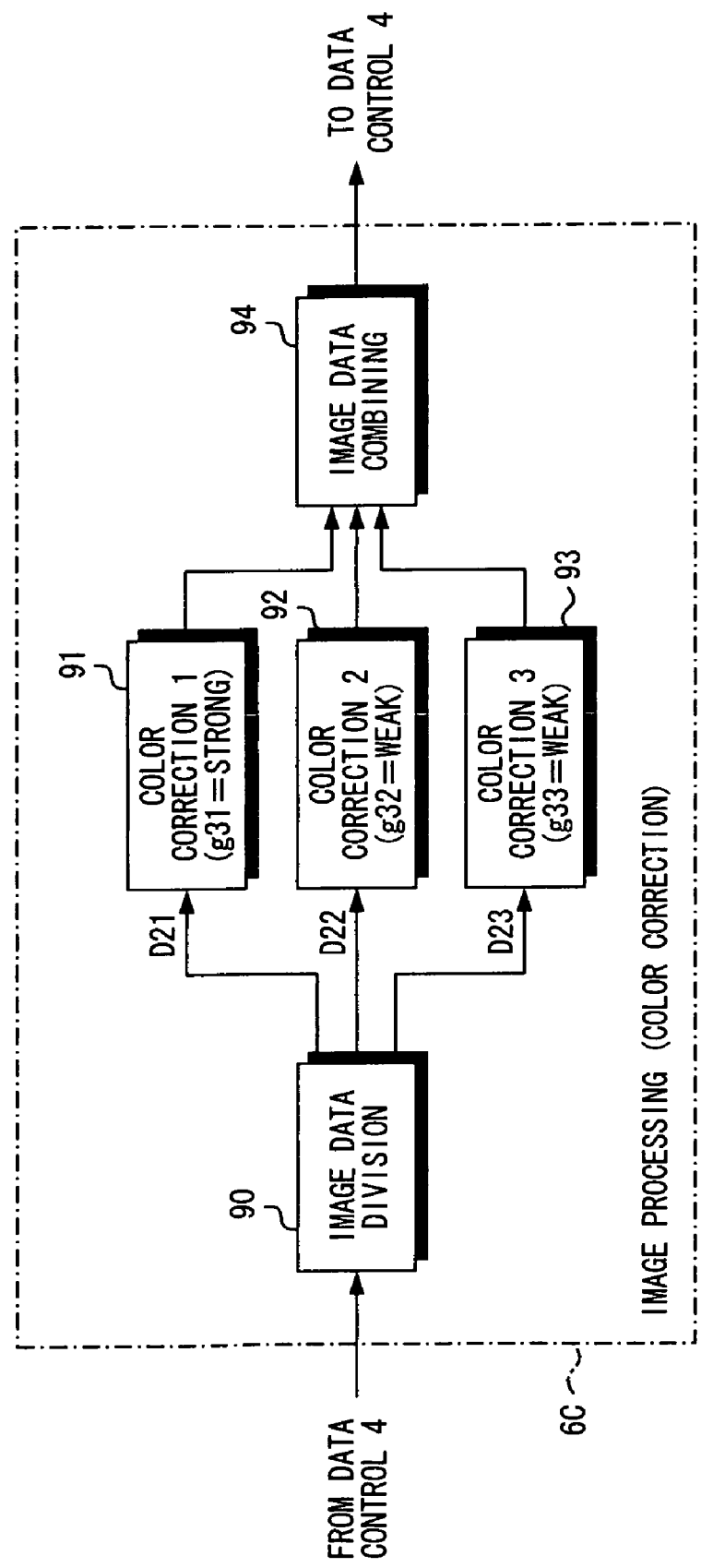

NOISE REDUCTION APPARATUS AND METHOD

BACKGROUND OF THE INVENTION

1. Field of the Invention

This invention relates to a noise reduction apparatus, contour correction apparatus, color correction apparatus and their control programs, as well as a noise reduction method, contour correction method and color correction method.

2. Description of the Related Art

In order to improve the image quality of the image of a subject obtained by sensing the image of the subject using a digital camera, the image is subjected to processing such as noise reduction processing and contour correction processing (see the specification of Japanese Patent Application Laid-Open No. 4-235472).

Further, although dividing an image on a frequency-band basis has been considered, image quality in such case is not always good (see the specification of Japanese Patent Application Laid-Open No. 2002-74356).

SUMMARY OF THE INVENTION

Accordingly, an object of the present invention is to improve image quality.

According to a first aspect of the present invention, the foregoing object is attained by providing a noise reduction apparatus comprising: an image data dividing device for dividing one frame of applied image data into a plurality of items of image data so as to have different frequency bands; a plurality of noise reduction processing circuits provided for respective ones of the items of image data divided by the image data dividing device so as to have different frequency bands, each noise reduction processing circuit executing noise reduction processing conforming to the frequency band of the image data applied thereto; and an image combining device for combining the plurality of items of image data, which have been subjected to noise reduction processing in respective ones of the plurality of noise reduction circuits, in such a manner that the image data will represent one frame of an image.

The first aspect of the present invention also provides a method suited to the noise reduction apparatus described above. Specifically, the present invention provides a noise reduction apparatus comprising the steps of: dividing one frame of applied image data into a plurality of items of image data so as to have different frequency bands; providing a plurality of noise reduction processing circuits for respective ones of the items of image data divided so as to have different frequency bands; in each noise reduction processing circuit, executing noise reduction processing conforming to the frequency band of the image data applied thereto; and combining the plurality of items of image data, which have been subjected to noise reduction processing in respective ones of the plurality of noise reduction circuits, in such a manner that the image data will represent one frame of an image.

The first aspect of the present invention also provides a program for implementing the method described above.

In accordance with the first aspect of the present invention, one frame's worth of image data is applied and the one frame of image data is divided into a plurality of items of image data so as to have different frequency bands. A plurality of noise reduction processing circuits are provided in association with respective ones of the plurality of images of image data having different frequency bands. Each noise reduction processing circuit executes noise reduction processing that corresponds to the frequency band of the image data applied thereto. The plurality of items of image data that have undergone noise reduction processing are combined so as to represent one frame of an image.

In accordance with the first aspect of the present invention, image data is divided so as to have different frequency bands and noise reduction processing that is suited to each of these frequency bands is executed. Thus it is possible to execute noise reduction processing that is appropriate for each area (frequency band) that constitutes an image.

The image data dividing device may divide the image data into a plurality of items of image data so as to include image data that maintains the frequency band of the one frame of image data applied thereto.

The image data dividing device may divide the image data into a plurality of items of image data so as to have different frequency bands in such a manner that one frequency band from among the frequency bands of the plurality of items of image data obtained by division will or will not be included in another frequency band.

The apparatus may further comprise a noise reduction processing control device for controlling noise reduction processing conforming to the frequency band of image data executed in each circuit of the plurality of noise reduction processing circuits, based upon information concerning the image represented by the one frame of applied image data.

Image information may be set by the user, stored in advance or calculated. If image data is obtained a digital camera, then ISO sensitivity, white balance gain, a color correction coefficient and an image quality mode may be set by the user. Items that may be stored in advance include the characteristics of an image sensing device, a shading characteristic, a gamma characteristic, a correction characteristic for light emission by electronic flash, number of recorded pixels and a reproduction band characteristic. Items calculated include shutter speed, EV/LV value, lens distortion characteristic, f-stop value, zoom position and color aberration characteristic.

The apparatus may further comprise a reading device which, in a case where one frame of image data applied to the image data dividing device has been recorded in an image data recording area of an image file and image information has been recorded in a header recording area of the image file, is for reading the image data and image information that have been recorded in the image file; and a noise reduction processing control device for controlling the noise reduction processing circuit that conforms to the frequency band of image data executed in each circuit of the plurality of noise reduction processing circuits, based upon the image information that has been read by the reading device.

In a case where the one frame of applied image data is color image data having a plurality of color components, the image data dividing device may be divide the image data into a plurality of items of image data so as to have a different frequency band for every color component.

According to a second aspect of the present invention, the foregoing object is attained by providing a contour correction apparatus comprising: an image data dividing device for dividing one frame of applied image data into a plurality of items of image data so as to have different frequency bands; a plurality of contour correction circuits provided for respective ones of the items of image data divided by the image data dividing device so as to have different frequency bands, each contour correction circuit executing a contour correction conforming to the frequency band of the image data applied thereto; and an image combining device for combining the plurality of items of image data, which have been subjected to contour correction in respective ones of the plurality of contour correction circuits, in such a manner that the image data will represent one frame of an image.

The second aspect of the present invention also provides a method suited to the contour correction apparatus described above. Specifically, the present invention provides a contour correction apparatus comprising the steps of: dividing one frame of applied image data into a plurality of items of image data so as to have different frequency bands; providing a plurality of contour correction circuits for respective ones of the items of image data divided so as to have different frequency bands; in each contour correction circuit, executing a contour correction conforming to the frequency band of the image data applied thereto; and combining the plurality of items of image data, which have been subjected to contour correction in respective ones of the plurality of contour correction circuits, in such a manner that the image data will represent one frame of an image.

The second aspect of the present invention also provides a program for implementing the method described above.

In accordance with the second aspect of the present invention, one frame's worth of image data is applied and the one frame of image data is divided into a plurality of items of image data so as to have different frequency bands. A plurality of contour correction circuits are provided in association with respective ones of the plurality of images of image data having different frequency bands. Each contour correction circuit executes contour correction processing that corresponds to the frequency band of the image data applied thereto. The plurality of items of image data that have undergone contour correction processing are combined so as to represent one frame of an image.

In accordance with the second aspect of the present invention, image data is divided so as to have different frequency bands and contour correction processing that is suited to each of these frequency bands is executed. Thus it is possible to execute contour correction processing that is appropriate for each area that constitutes an image.

According to a third aspect of the present invention, the foregoing object is attained by providing a color correction apparatus comprising: an image data dividing device for dividing one frame of applied image data into a plurality of items of image data so as to have different frequency bands; a plurality of color correction circuits provided for respective ones of the items of image data divided by the image data dividing device so as to have different frequency bands, each color correction circuit executing a color correction conforming to the frequency band of the image data applied thereto; and an image combining device for combining the plurality of items of image data, which have been subjected to color correction in respective ones of the plurality of contour correction circuits, in such a manner that the image data will represent one frame of an image.

The third aspect of the present invention also provides a method suited to the color correction apparatus described above. Specifically, the present invention provides a color correction apparatus comprising the steps of: dividing one frame of applied image data into a plurality of items of image data so as to have different frequency bands; providing a plurality of color correction circuits for respective ones of the items of image data divided so as to have different frequency bands; in each color correction circuit, executing a color correction conforming to the frequency band of the image data applied thereto; and combining the plurality of items of image data, which have been subjected to color correction in respective ones of the plurality of color correction circuits, in such a manner that the image data will represent one frame of an image.

The third aspect of the present invention also provides a program for implementing the method described above.

In accordance with the third aspect of the present invention, one frame's worth of image data is applied and the one frame of image data is divided into a plurality of items of image data so as to have different frequency bands. A plurality of color correction circuits are provided in association with respective ones of the plurality of images of image data having different frequency bands. Each color correction circuit executes color correction processing that corresponds to the frequency band of the image data applied thereto. The plurality of items of image data that have undergone color correction processing are combined so as to represent one frame of an image.

In accordance with the third aspect of the present invention, image data is divided so as to have different frequency bands and color correction processing that is suited to each of these frequency bands is executed. Thus it is possible to execute color correction processing that is appropriate for each area that constitutes an image.

In the second and third aspects of the present invention also, as in the first aspect of the invention, it may be so arranged that the image data is divided into image data that maintains the frequency band of the one frame of image data applied thereto, and the image data may be divided into a plurality of items of image data so as to have different frequency bands in such a manner that one frequency band from among the frequency bands of the plurality of items of image data obtained by division will or will not be included in another frequency band. Further, in a case where the one frame of applied image data is color image data having a plurality of color components, the image data dividing device may divide the image data into a plurality of items of image data so as to have a different frequency band for every color component.

Furthermore, a contour correction control device, color correction control device and reading device that correspond to the noise reduction processing control device and reading device may be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a block diagram illustrating the electrical structure of an image processing circuit;

FIG. 10 is a block diagram illustrating the electrical structure of an image processing circuit;

DESCRIPTION OF THE PREFERRED EMBODIMENTS

Preferred embodiments of the present invention will now be described in detail with reference to the drawings.

Figure 1:
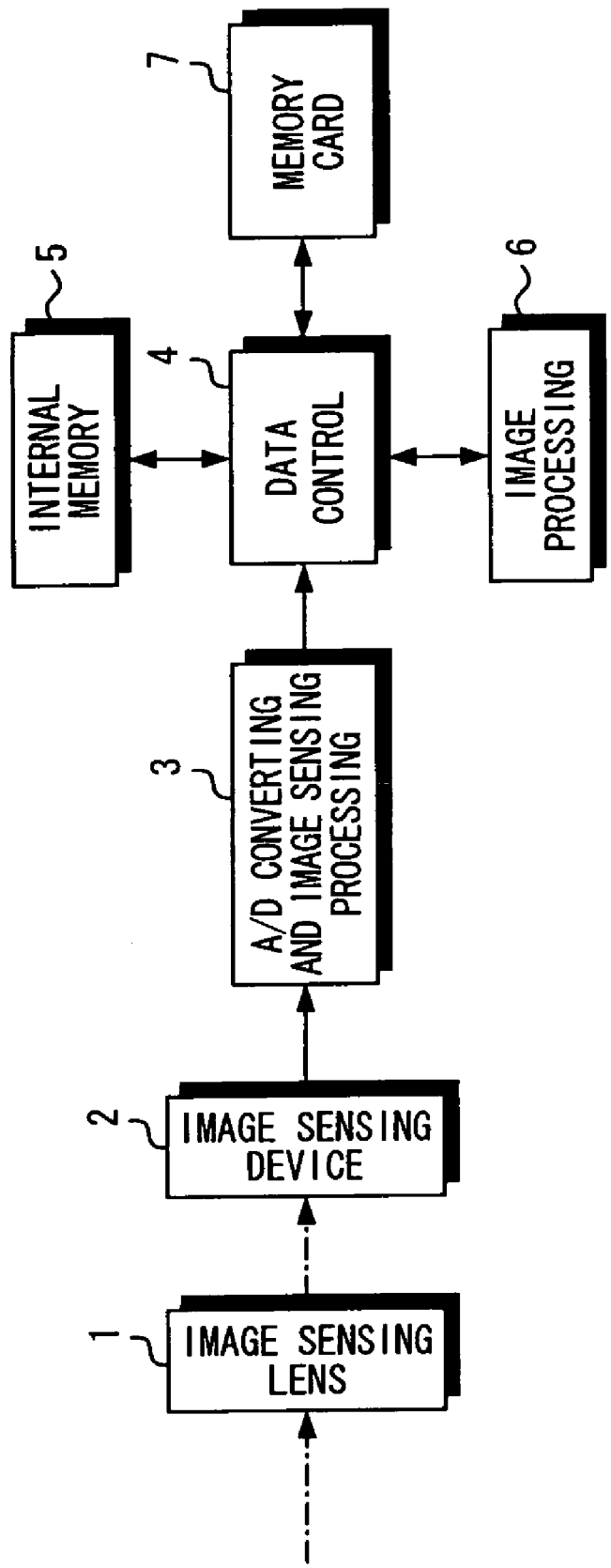
FIG. 1 is a block diagram illustrating the electrical structure of a digital still camera.

FIG. 1 is a block diagram illustrating the electrical structure of a digital still camera according to a preferred embodiment of the invention.

The image of a subject is sensed by an image sensing lens 1 and the light image representing the image of the subject is formed on the photoreceptor surface of an image sensing device 2 such as a CCD. The image sensing device 2 outputs a color video signal representing a color image (or monochrome image) of the subject and inputs the video signal to a processing circuit 3 that applies an analog-to-digital conversion and image sensing processing.

Specifically, the color video signal is converted to digital color image data in the processing circuit 3. Further, the image data obtained by the conversion is subjected to prescribed image sensing processing such as a gamma correction and white balance adjustment. The image data that is output from the processing circuit 3 is applied to a data control circuit 4. The latter applies the image data to a display unit (not shown), whereby the image of the subject is displayed.

If a shutter-release button (not shown) is pressed, the image data that has been output from the analog/digital converting and image sensing processing circuit 3 in the manner described above is applied to an internal memory 5 by the data control circuit 4, whereby the data is stored in internal memory temporarily. The image data is read out of the internal memory 5 by the data control circuit 4 and applied to an image processing circuit 6. The latter executes noise reduction processing that is suited to each individual frequency band. The processing executed by the image processing circuit 6 will be described in detail later.

Image data that is output from the image processing circuit 6 is recorded on a memory card 7 by the data control circuit 6.

When an image is to be reproduced, the image data that has been recorded on the memory card 7 is read by the data control circuit 4. The image represented by the read image data is applied to a display unit (not shown), whereby the reproduced image is displayed.

Figure 2:
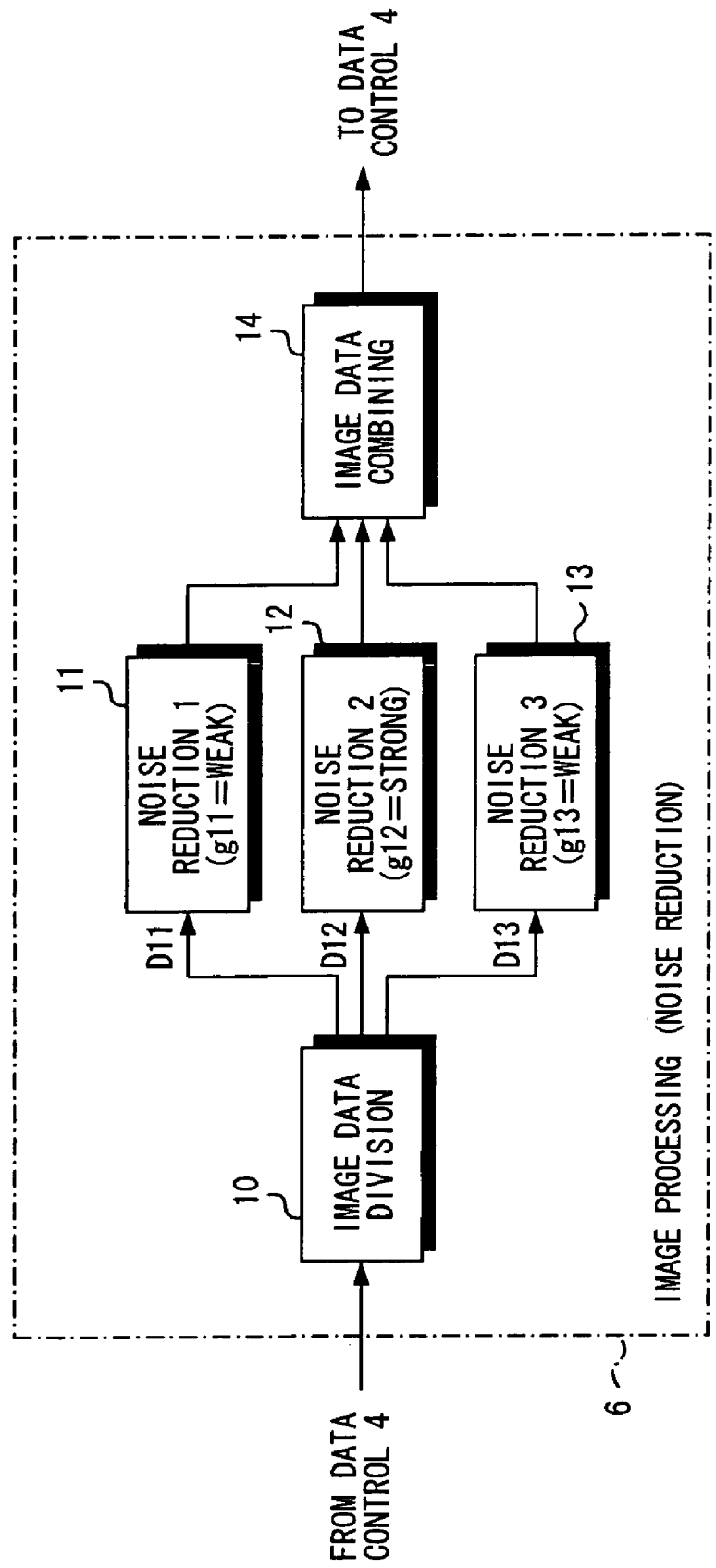
FIG. 2 is a block diagram illustrating the electrical structure of an image processing circuit.

FIG. 2 is a block diagram illustrating the electrical structure of the image processing circuit 6.

Figure 3A:
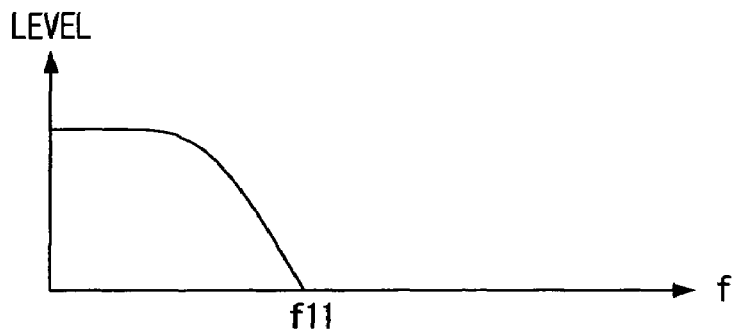
FIGS. 3A to 3C illustrate frequency characteristics of image data that has been divided into respective ones of three difference frequency bands.
Figure 3B:
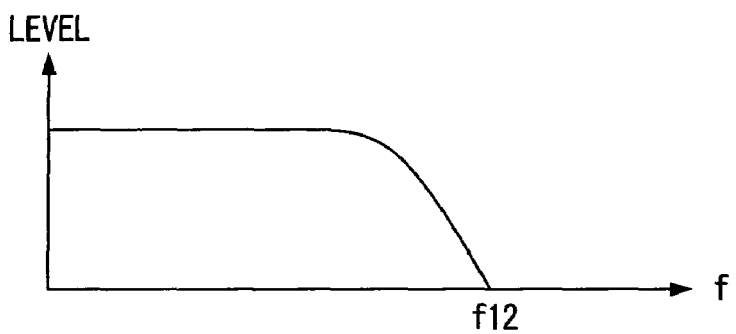
Figure 3C:
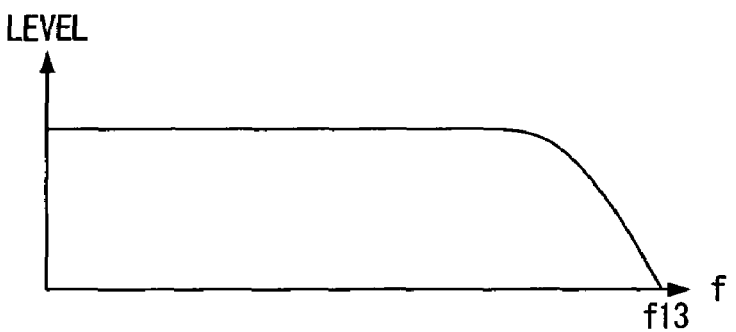

The image data that has been input to the image processing circuit 6 is input to an image data dividing circuit 10. The latter divides the image data into three items of image data having frequency bands that differ from one another. Naturally it may be so arranged that the image data is divided into two or four or more items of image data rather than three. The frequency characteristics of these items of image data, namely first image data D11, second image data D12 and third image data D13, thus obtained by division are as illustrated in FIGS. 3A, 3B and 3C, respectively. The first image data D11 has frequency components in a low-frequency region below frequency f11 and does not have frequency components in an intermediate-frequency region and frequency components in a high-frequency region. The second image data D12 has frequency components in low- and intermediate-frequency regions below frequency f12 (f11<f12) and does not have frequency components in a high-frequency region. The third image data D13 has frequency components in low-, intermediate- and high-frequency regions below frequency f13 (f12<f13). Of course, the third image data D13 is not necessarily limited to frequencies below f13 and may be the input image data per se.

The dividing of the image data can be performed utilizing processing that employs a multistage filter, multiple-resolution processing or processing that employs a wavelet transform.

The items of first image data D11, second image data D12 and third image data D13 output from the image data dividing circuit 10 and having different frequency-band components are input to a first noise reduction circuit 11, second noise reduction circuit 12 and third noise reduction circuit 13, respectively. The first noise reduction circuit 11, second noise reduction circuit 12 and third noise reduction circuit 13 execute noise reduction processing suited to the band components of respective ones of the items of image data input thereto. The first noise reduction circuit 11 executes noise reduction processing suited to the band components of the low-frequency region and has been set to a noise parameter g11 in such a manner that the noise reduction will be comparatively weak. The second noise reduction circuit 12 executes noise reduction processing suited to the band components of the low- and intermediate-frequency regions and has been set to a noise parameter g12 in such a manner that the noise reduction will be comparatively strong. The third noise reduction circuit 13 executes noise reduction processing suited to the band components of the low-, intermediate- and high-frequency regions and has been set to a noise parameter g13 in such a manner that the noise reduction will be comparatively weak. Thus, the first, second and third noise reduction circuits 11, 12 and 13 have been set in accordance with the band components, thereby making it possible to effectively remove noise in image data having a large amount of noise in the band components of the intermediate-frequency region. A noise reduction method of this kind is particularly useful for application to image data that has undergone contour correction processing.

The first, second and third image data D11, D12 and D13 from which noise has thus been reduced is output from the first, second and third noise reduction circuits 11, 12 and 13, respectively, and is input to an image data combining circuit 14. The latter subjects the image data to image data combining processing so as to represent one frame of the image of a subject. The combining of the image data can be implemented by utilizing addition processing or subtraction processing. The output from the image data combining circuit 14 is the output of the image processing circuit 6 and is recorded on the memory card 7 in the manner described above.

Figure 4:
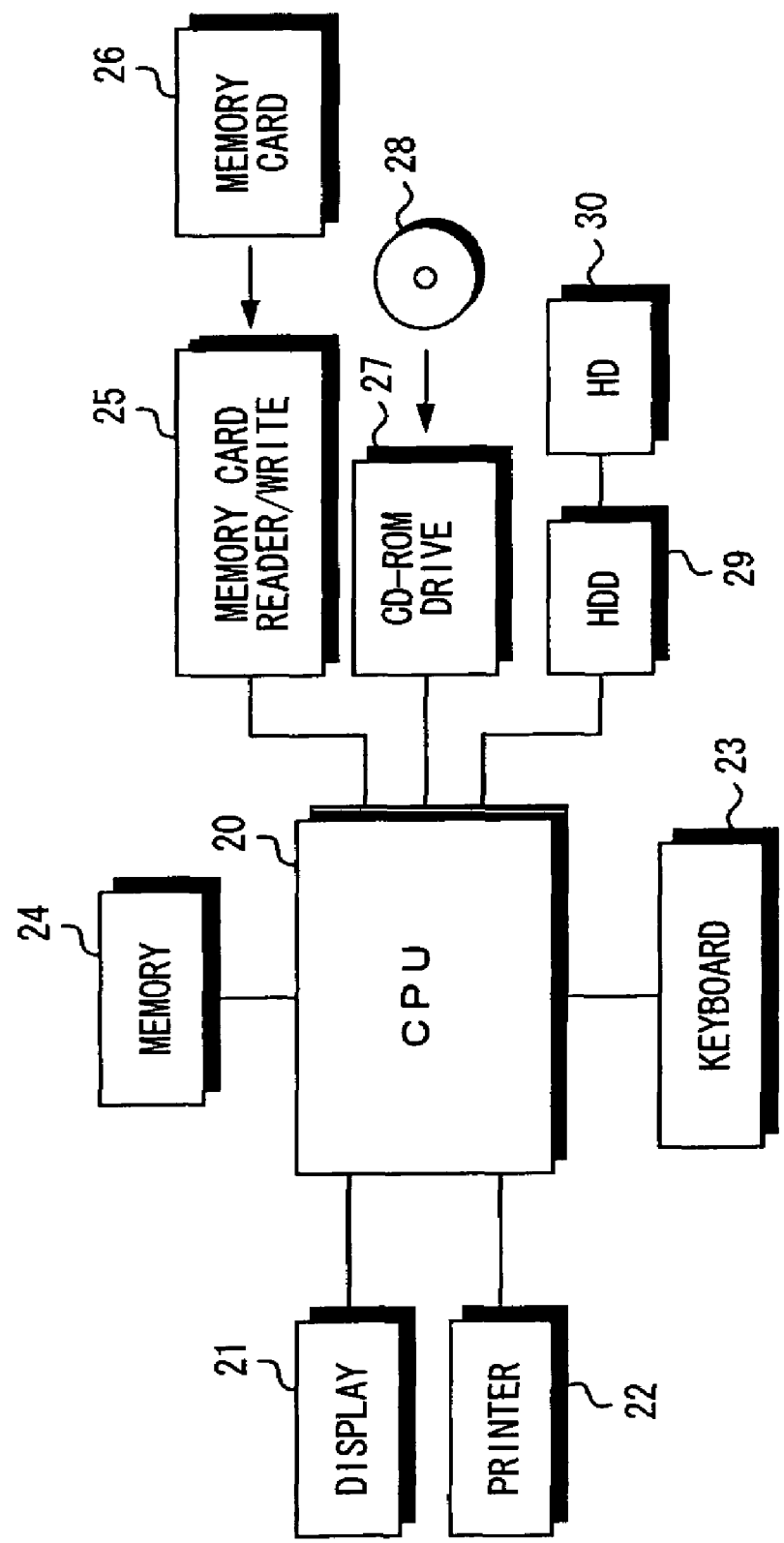
FIG. 4 is a block diagram illustrating the electrical structure of a computer system.

FIG. 4 is a block diagram illustrating the electrical structure of a computer system.

Noise reduction processing suited to each frequency band can be implemented, as set forth above, utilizing such a computer system as well.

The computer system includes a CPU 20 to which a monitor 21 and printer 22 have been connected. Also connected to the CPU 20 is a keyboard 23 for inputting commands and the like to the computer system. A memory 24 for storing image data and the like temporarily is further connected to the CPU 20.

The computer system further includes a memory card reader/write 25. The latter reads image data that has been recorded on a memory card 26 and writes image data to the memory card 26. A CD-ROM drive 27 has also been connected to the computer system. A CD-ROM 28 containing a program for the above-described noise reduction (contour correction and color correction, described later) is loaded in the CD-ROM drive 27, whereby the program is read from the CD-ROM and installed in the computer system.

The computer system further includes a hard-disk drive 29 in which it is possible to record image data that has undergone noise reduction processing.

Figure 5:
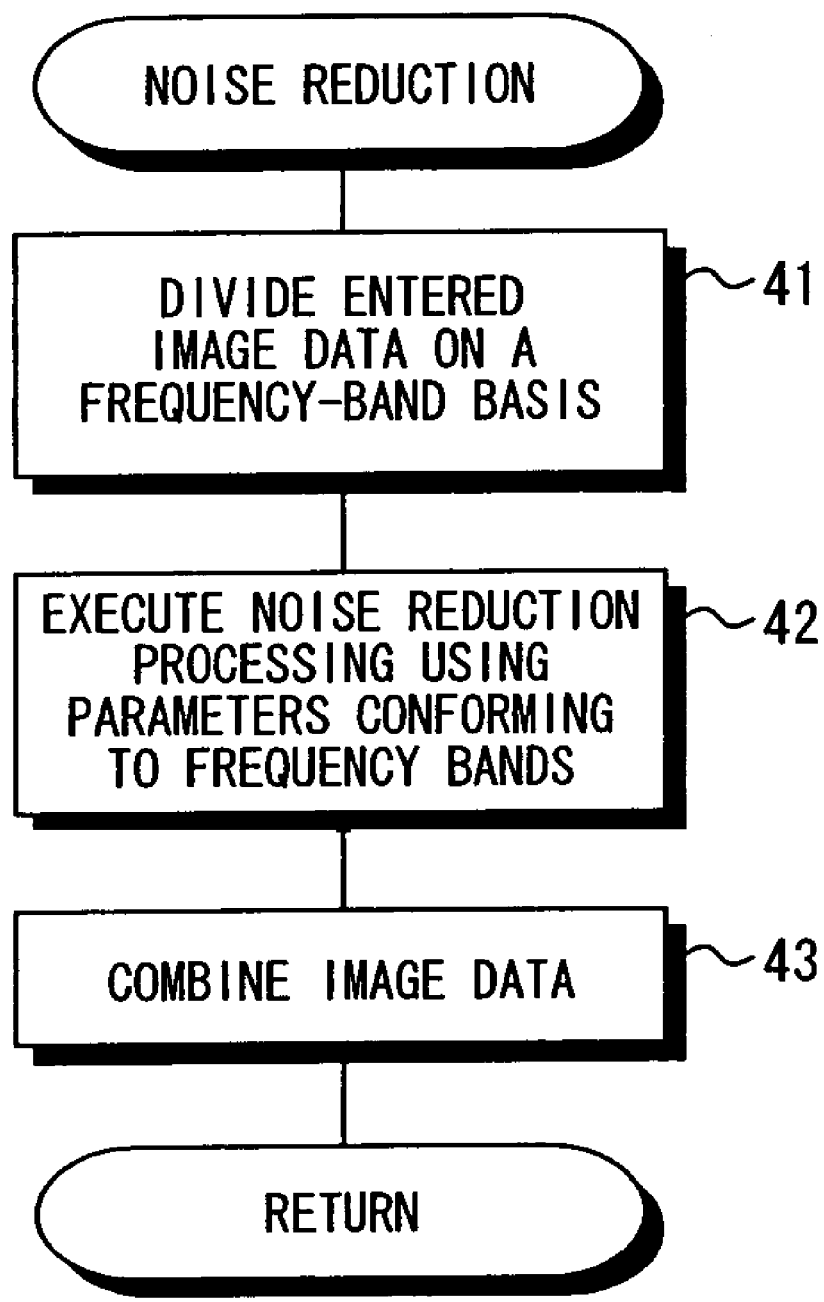
FIG. 5 is a flowchart illustrating noise reduction processing.

FIG. 5 is a flowchart illustrating the procedure of noise reduction processing.

Image data that has been recorded on the memory card 26 is read by loading the memory card 26 into the memory card reader/write 25. As described above, the read image data is divided into the three items of image data of the low-frequency region, low- and intermediate-frequency regions and low-, intermediate-and high-frequency regions (step 41). Noise reduction processing is applied to respective ones of the three items of image data using parameters conforming to respective ones of the three items of image data (step 42). Three items of image data that have been subjected to noise reduction processing in conformity with the frequency bands are combined and image data representing one frame of an image is generated (step 43).

Figure 6:
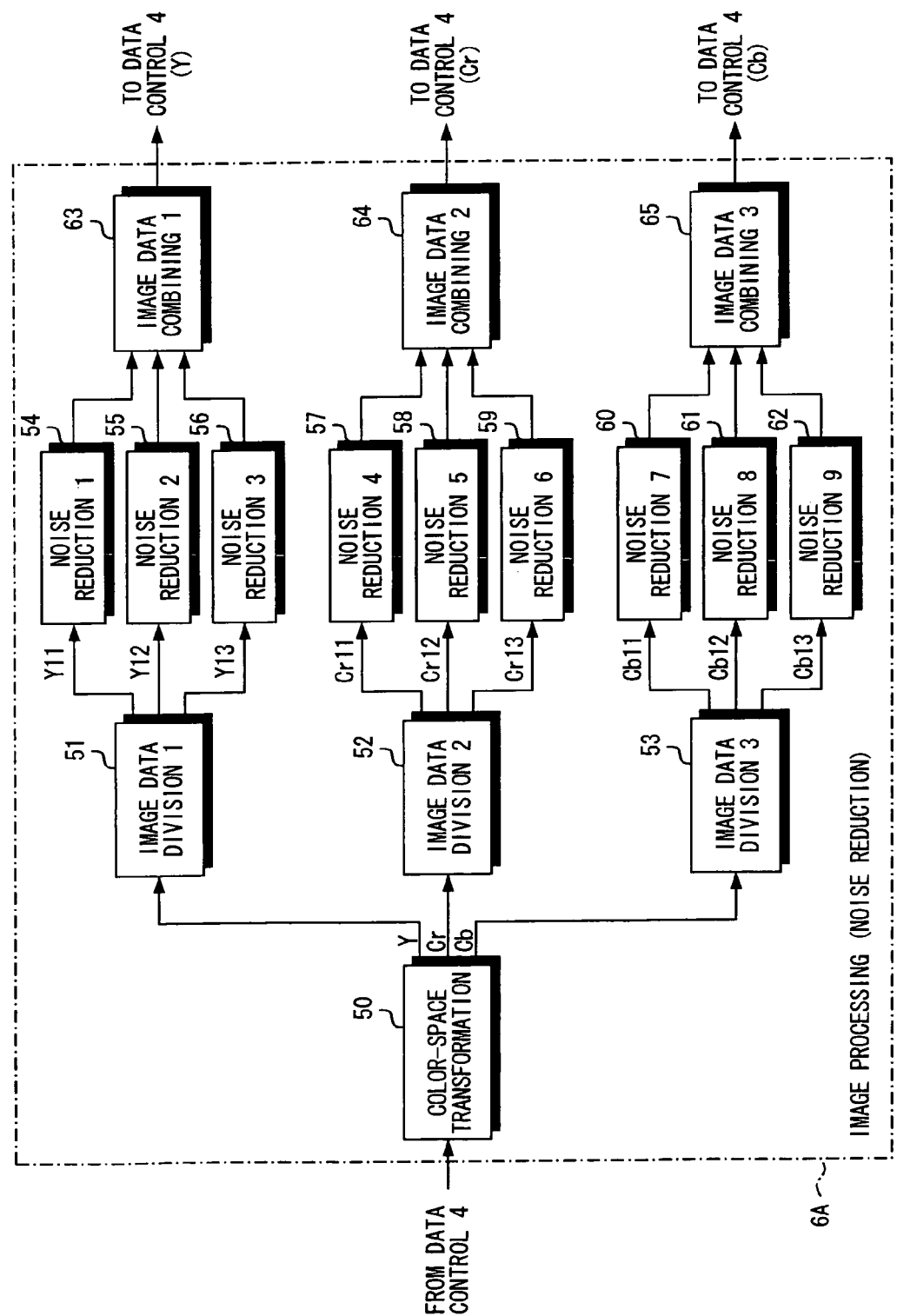
FIG. 6 is a block diagram illustrating the electrical structure of an image processing circuit.
Figure 7:
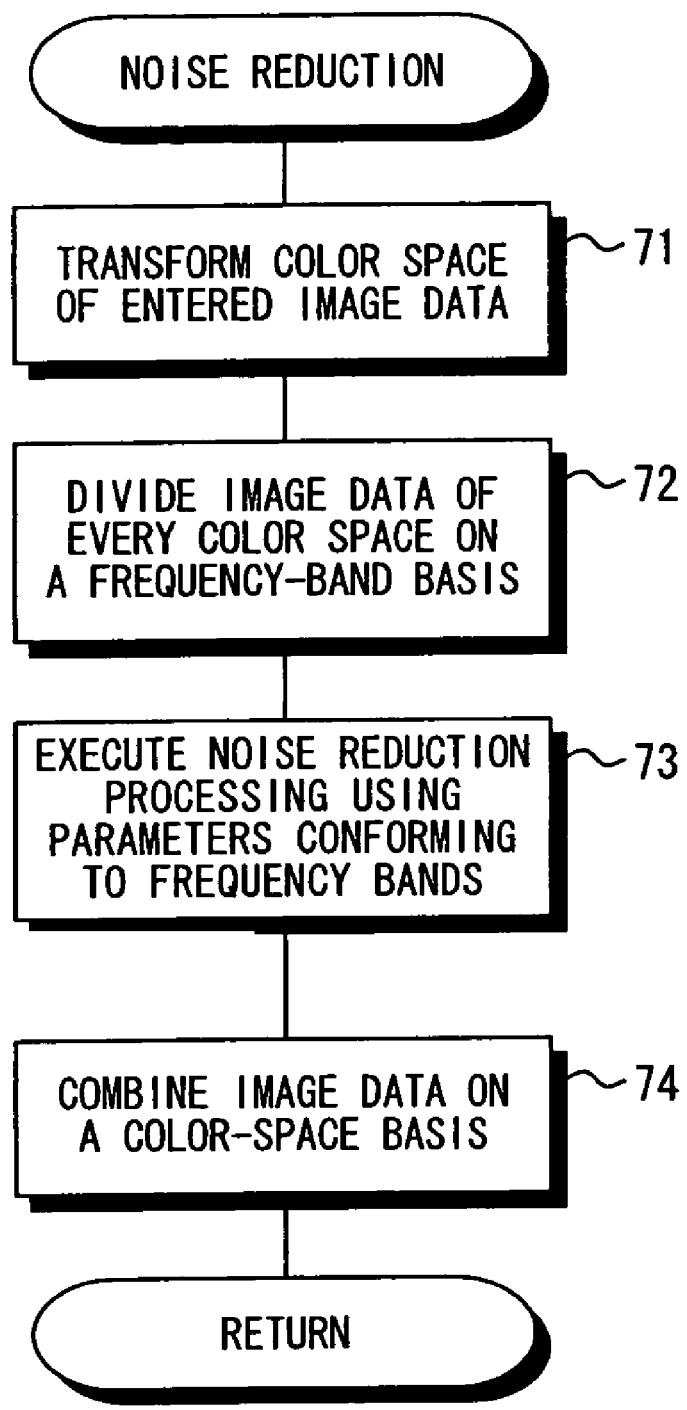
FIG. 7 is a flowchart illustrating noise reduction processing.

FIGS. 6 and 7 illustrate a modification of this embodiment.

FIG. 6 is a block diagram illustrating the electrical structure of an image processing circuit according to this modification.

Here color image data is input to an image processing circuit 6A, which proceeds to apply image dividing processing and noise reduction processing to the above-described image data on a color-component basis.

Color image data containing color components of the three primary colors of R (red), G (green) and B (blue) is input to the image processing circuit 6A. The color image data is converted to luminance data Y and color difference data Cr and Cb in a color-space transforming circuit 50. The luminance data Y and color difference data Cr and Cb output from the color-space transforming circuit 50 is input to a first image data dividing circuit 51, second image data dividing circuit 52 and third image data dividing circuit 53, respectively.

The first image data dividing circuit 51, which is for the luminance data Y, divides the entered luminance data into first luminance data Y11, second luminance data Y12 and third luminance data Y13 having frequency components in the low-frequency region, frequency components in the low- and intermediate-frequency regions and frequency components in the low-, intermediate- and high-frequency regions, respectively, in a manner similar to that described above. The items of first luminance data Y11, second luminance data Y12 and third luminance data Y13 are input to a first noise reduction circuit 54 for the low-frequency region, a second noise reduction circuit 55 for the intermediate-frequency region and a third noise reduction circuit 56 for the high-frequency region, respectively. In a manner similar to that described above, a parameter such that a weak noise reduction will be performed has been set in the first noise reduction circuit 54 and third noise reduction circuit 56, and a parameter such that a strong noise reduction will be performed has been set in the second noise reduction circuit 55. Noise reduction processing in which noise reduction is emphasized is applied to the second luminance data Y12 of the intermediate-frequency region. The luminance data Y11, Y12 and Y13 that is output from the first, second and third noise reduction circuits 54, 55 and 56, respectively, is applied to a first image data combining circuit 63, whereby luminance data Y representing one frame of an image is obtained. By applying the luminance data Y to the data control circuit 4, luminance data that has been subjected to noise reduction processing conforming to the frequency band is recorded on the memory card.

The second image data dividing circuit 52, which is for the color difference data Cr, divides the color difference data into first color difference data Cr11, second color difference data Cr12 and third color difference data Cr13 having frequency components in the low-frequency region, frequency components in the low- and intermediate-frequency regions and frequency components in the low-, intermediate- and high-frequency regions, respectively. The items of first color difference data Cr11, second color difference data Cr12 and third color difference data Cr13 are input to first, second and third noise reduction circuits 57, 58 and 59, respectively, which have been set to parameters suited to noise reduction of frequency components in the low-frequency region, frequency components of the low- and intermediate-frequency regions and frequency components of the low-, intermediate- and high-frequency regions, respectively. The items of first color difference data Cr11, second color difference data Cr12 and third color difference data Cr13 are that have undergone noise reduction are input to a second image data combining circuit 64, which proceeds to generate color difference data Cr representing one frame of an image.

The third image data dividing circuit 53, which is for the color difference data Cb, divides the color difference data into first color difference data Cb11, second color difference data Cb12 and third color difference data Cb13 having frequency components in the low-frequency region, frequency components in the low- and intermediate-frequency regions and frequency components in the low-, intermediate- and high-frequency regions, respectively. The items of first color difference data Cb11, second color difference data Cb12 and third color difference data Cb13 are input to first, second and third noise reduction circuits 60, 61 and 62, respectively, which have been set to parameters suited to noise reduction of frequency components in the low-frequency region, frequency components of the low- and intermediate-frequency regions and frequency components of the low-, intermediate- and high-frequency regions, respectively. The items of first color difference data Cb11, second color difference data Cb12 and third color difference data Cb13 are that have undergone noise reduction are input to a third image data combining circuit 65, which proceeds to generate color difference data Cb representing one frame of an image.

Thus, the degree of noise reduction processing can be changed for every color component. For example, in an instance where the input image data is of the kind obtained by taking a picture using light from a tungsten lamp, processing that emphasizes the blue color component may be executed. In this case, noise in the color difference data Cb can be suppressed to a greater degree.

In the processing described above, processing for transforming the color space of the entered color image data is executed. However, processing for simply dividing the data on a color-component basis may be executed. Further, it goes without saying that the color space is not limited solely to luminance data Y and color difference data Cr and Cb and may be another color space such as Lab color space.

Although the above-described processing is applied to noise reduction, it can be applied to contour processing as well in a similar manner. For example, in a case where the applied image data is image data that has undergone a white balance adjustment that raises the gain of the blue color component, it is so arranged that the intermediate- and high-frequency components of the color difference data Cr and Cb are made relatively weak. The same holds true for a color correction. For example, in a case where it is desired to emphasize a specific color, it is possible to emphasize the image data of the low-frequency components of the color desired to be emphasized.

FIG. 7 is a flowchart illustrating the procedure of noise reduction processing.

First, the color space of the entered color image data is transformed (step 71). Processing for dividing the image data on a color-space basis is executed in such a manner that the image data is divided on a frequency-band basis (step 72). Noise reduction processing suited to the frequency bands is executed using parameters conforming to the frequency bands (step 73). Combining of the image data is performed in such a manner that the divided image data becomes one frame of an image for every color space (step 74).

FIGS. 8 and 9 illustrate another embodiment of the present invention.

FIG. 8 is a block diagram illustrating the electrical structure of an image processing circuit.

Whereas the above-described image processing circuit is for reducing noise, an image processing circuit 6B shown in FIG. 8 is for contour correction. The contour correction processing also is executed so as to be suited to a frequency band for every frequency band of the image data. Further, the contour correction is applied to data representing three contour images of low-, intermediate- and high-frequency components.

Figure 9A:
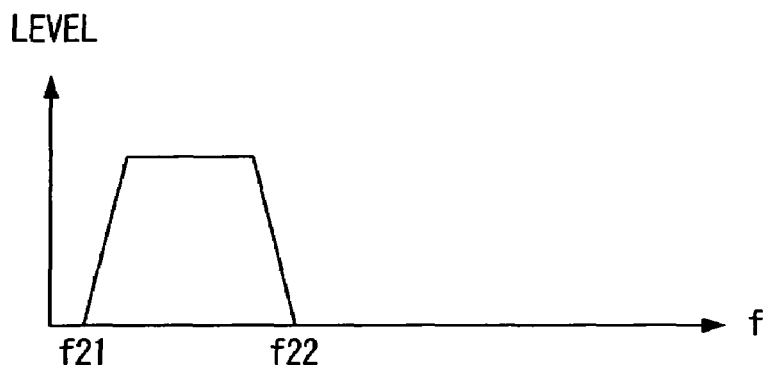
FIGS. 9A to 9C illustrate frequency characteristics of image data that has been divided into respective ones of three difference frequency bands.
Figure 9B:
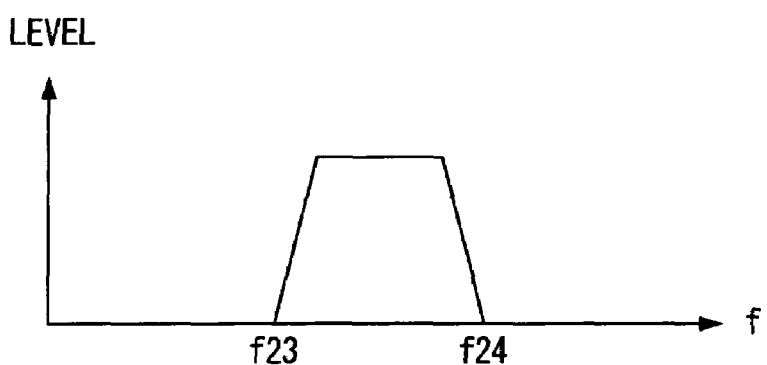
Figure 9C:
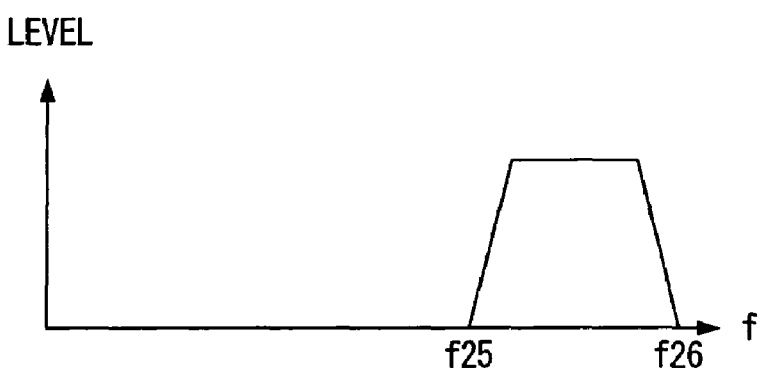

The image data that has been input to the image processing circuit 6B is divided by an image data dividing circuit 80 into first image data D21 of low-frequency components, second image data D22 of intermediate-frequency components and third image data D23 of high-frequency components. The first image data D21 has frequency components in the range of low frequencies from f21 to f22, as illustrated in FIG. 9A. The second image data D22 has frequency components in the range of intermediate frequencies from f23 to f24, as illustrated in FIG. 9B. The third image data D23 has frequency components in the range of high frequencies from f25 to f26, as illustrated in FIG. 9C. It should be noted that $f21<f22<f23<f24<f25<f26$.

The items of first image data D21, second image data D22 and third image data D23 are input to a first contour correction circuit 81, second contour correction circuit 82 and third contour correction circuit 83, respectively. The first contour correction circuit 81, which is for low frequencies, has been set in such a manner that the degree of contour correction (emphasis) will be comparatively weak. The second contour correction circuit 82 and third contour correction circuit 83, which are for intermediate and high frequencies, respectively, have been set in such a manner that the degree of contour correction will be comparatively strong. Since the image data D22 and D23 representing the contour images of the intermediate- and high-frequency regions has a degree of contour correction higher than that of the image data representing the contour image of the low-frequency region, an image having an attractive appearance is obtained.

The contour-corrected image data D21, D22 and D23 output from the first, second and third contour correction circuits 81, 82 and 83 is input to an image data combining circuit 84. The latter combines the image data and produces image data representing one frame of an image.

FIG. 10 is a block diagram illustrating the electrical structure of an image processing circuit according to another embodiment of the present invention.

An image processing circuit 6C shown in FIG. 10 is for performing a color correction. The color correction processing also is executed so as to be suited to a frequency band for every frequency band of the image data. Further, the color correction is applied to three different items of frequency-component data, namely low-, intermediate- and high-frequency components.

The image data that has been input to the image processing circuit 6C is divided by an image data dividing circuit 90 into the first image data D21 of low-frequency components, second image data D22 of intermediate-frequency components and third image data D23 of high-frequency components in a manner similar to that of the contour correction described above. As described above, the first image data D21 has frequency components in the range of low frequencies from f21 to f22, as illustrated in FIG. 9A, the second image data D22 has frequency components in the range of intermediate frequencies from f23 to f24, as illustrated in FIG. 9B, and the third image data D23 has frequency components in the range of high frequencies from f25 to f26, as illustrated in FIG. 9C.

The items of first image data D21, second image data D22 and third image data D23 are input to a first color correction circuit 91, second color correction circuit 92 and third color correction circuit 93, respectively. The first color correction circuit 91, which is for low frequencies, has been set in such a manner that the degree of color correction (emphasis) will be comparatively strong. The second color correction circuit 92 and third color correction circuit 93, which are for intermediate and high frequencies, respectively, have been set in such a manner that the degree of color correction will be comparatively weak. Since the image data D22 and D23 representing the frequency components of the intermediate- and high-frequency regions has a degree of color correction lower than that of the image data representing the frequency components of the low-frequency region, color can be emphasized without causing an increase in noise in the intermediate- and high-frequency regions.

The color-corrected image data D21, D22 and D23 output from the first, second and third color correction circuits 91, 92 and 93 is input to an image data combining circuit 94. The latter combines the image data and produces image data representing one frame of an image.

FIGS. 11 to 15 illustrate yet another embodiment regarding noise reduction processing.

Figure 11:
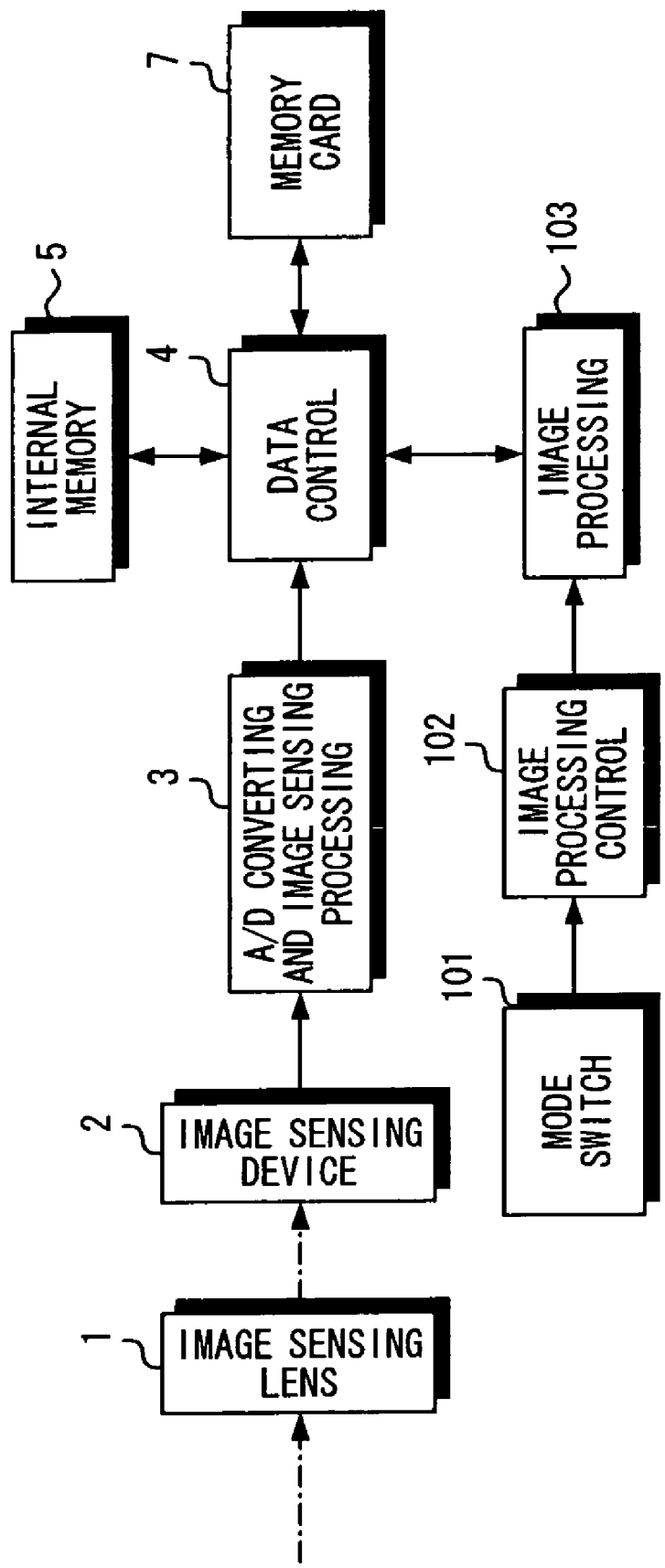
FIG. 11 is a block diagram illustrating the electrical structure of a digital still camera.

FIG. 11 is a block diagram illustrating the electrical structure of a digital still camera according to this embodiment, in which components identical with those shown in FIG. 1 are designated by like reference characters and need not be described again.

In the image processing (noise reduction processing, contour correction processing and color correction processing, etc.) executed in the digital still camera described above, parameters used in image processing have been set in advance. In the digital still camera depicted in FIG. 11, however, image information is acquired and parameters used in image processing are decided based upon the acquired image information.

Image information may be set by the user, stored in advance or calculated. However, in the example illustrated below, parameters used in image processing are decided in accordance with the a mode set by the user.

The digital still camera includes a mode switch 101. An image sensing mode or a playback mode can be set using the mode switch 101. Furthermore, the image sensing mode includes a portrait mode set in a case where the subject is a person, a scenery mode set in a case where the subject is scenery, a text mode set in a case where the subject is text, and a red emphasizing mode for emphasizing the color red.

The signal indicating the mode set in the mode switch 101 is input to an image processing control circuit 102. In accordance with the mode set by the mode switch 101, the image processing control circuit 102 decides the parameters of image processing executed in an image processing circuit 103. The data representing the decided parameters is applied to the image processing circuit 103. In accordance with the parameters provided by the image processing control circuit 102, the image processing circuit 103 executes image processing suited to each frequency band.

Figure 12:
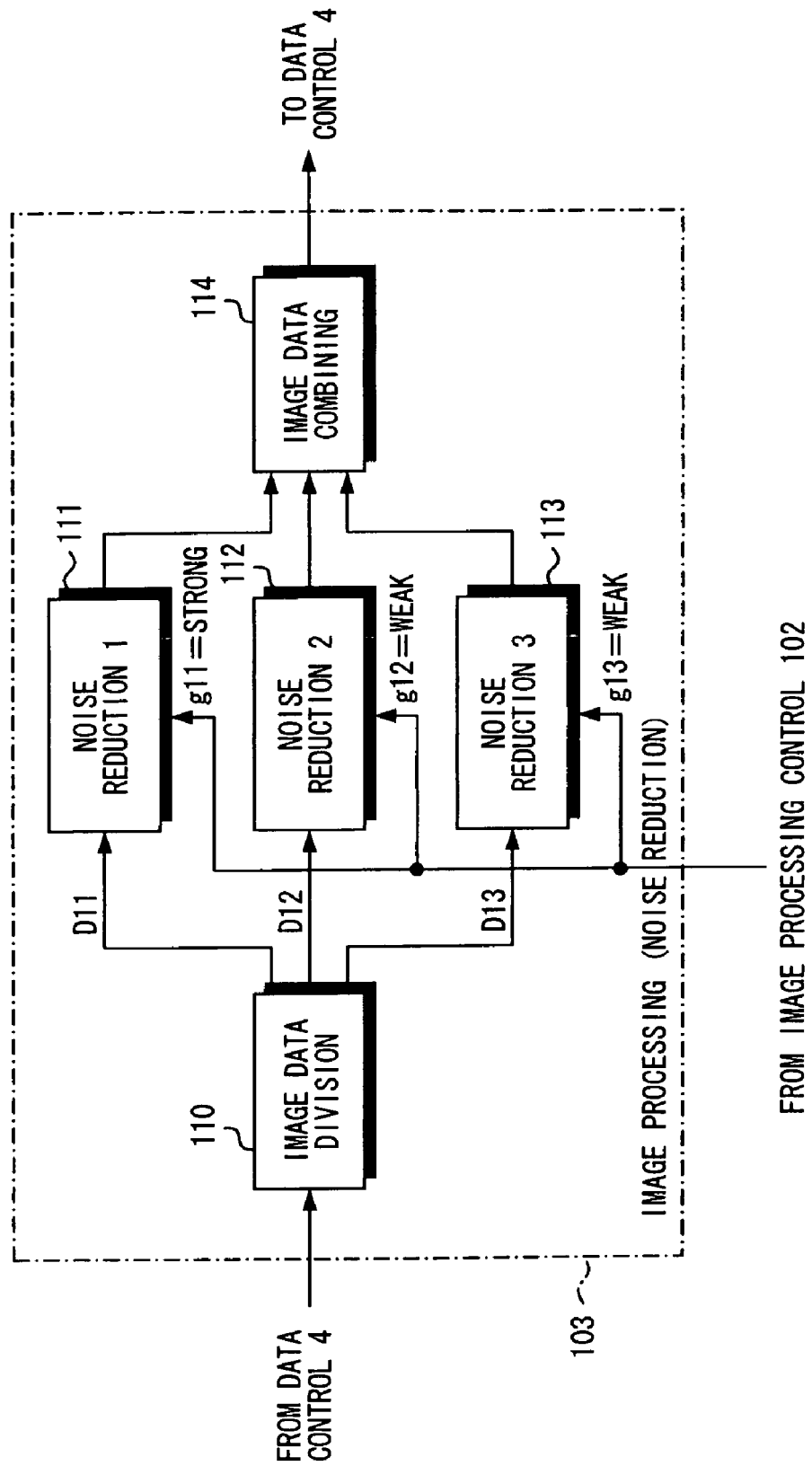
FIG. 12 is a block diagram illustrating the electrical structure of an image processing circuit.

FIG. 12 is a block diagram illustrating the electrical structure of the image processing circuit 103.

It will be assumed that the text mode has been selected as the image sensing mode by the mode switch 101.

The image data provided by the data control circuit 4 is divided by an image data dividing circuit 110 into first image data D11 containing frequency components in a low-frequency region, second image data D12 containing frequency components in low- and intermediate-frequency regions, and third image data D13 (see FIG. 3) containing frequency components in low-, intermediate- and high-frequency regions. The items of first image data D11, second image data D12 and third image data D13 are input to a first noise reduction circuit 111, second noise reduction circuit 112 and third noise reduction circuit 113, respectively.

First parameters g11, g12 and g13, which are for noise reduction conforming to every frequency band and the text mode regarding image data that has been divided on a frequency-band basis are applied to the first noise reduction circuit 111, second noise reduction circuit 112 and third noise reduction circuit 113, respectively, from the image processing control circuit 102. The first parameter g11 is set in such a manner that strong noise reduction is carried out, and the second and third parameters g12 and g13, respectively, are set in such a manner that weak noise reduction is carried out. In a case where the camera has been set to the text mode, it is preferred that the text have a sharp and clear appearance and therefore the low-frequency components are emphasized. Since noise in these components also is emphasized, low-frequency noise reduction is strengthened.

The items of image data that have been-subjected to noise reduction processing in respective ones of the first noise reduction circuit 111, second noise reduction circuit 112 and third noise reduction circuit 113 are applied to an image data combining circuit 114. The latter combines the image data.

The above-described processing may be executed by a computer system.

Figure 13:
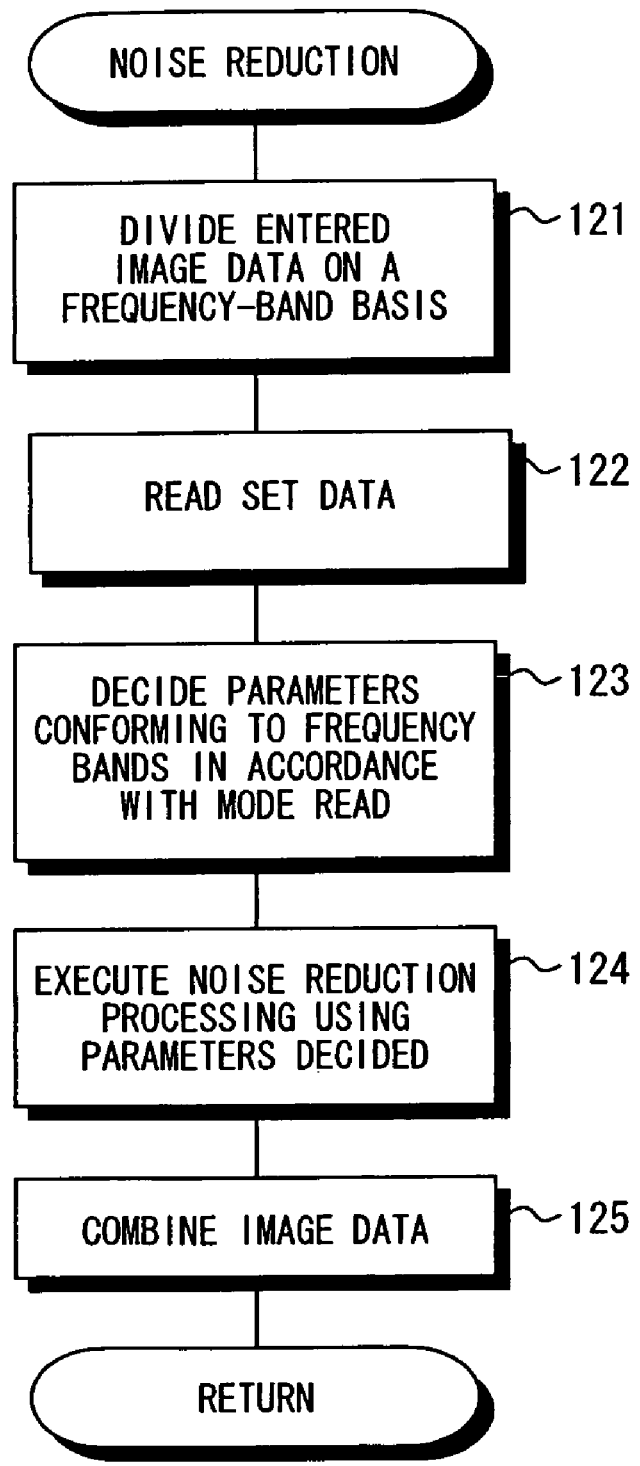
FIG. 13 is a flowchart illustrating noise reduction processing.

FIG. 13 is a flowchart illustrating the procedure of noise reduction processing set forth above.

The entered image data is divided into the three items of data D11, D12 and D13 on a frequency-band basis (step 121). Next, the mode that has been set by the mode switch 101 is read by the image processing control circuit 102 (step 122). In accordance with the read mode, parameters conforming to respective ones of the frequency bands are decided (step 123). The image data that has been divided on a frequency-band basis is subjected to noise reduction using the decided parameters (step 124). The combining of the image data is performed in such a manner that the image data that has undergone noise reduction and been divided on a frequency-band basis will become one frame of an image (step 125).

Figure 14:
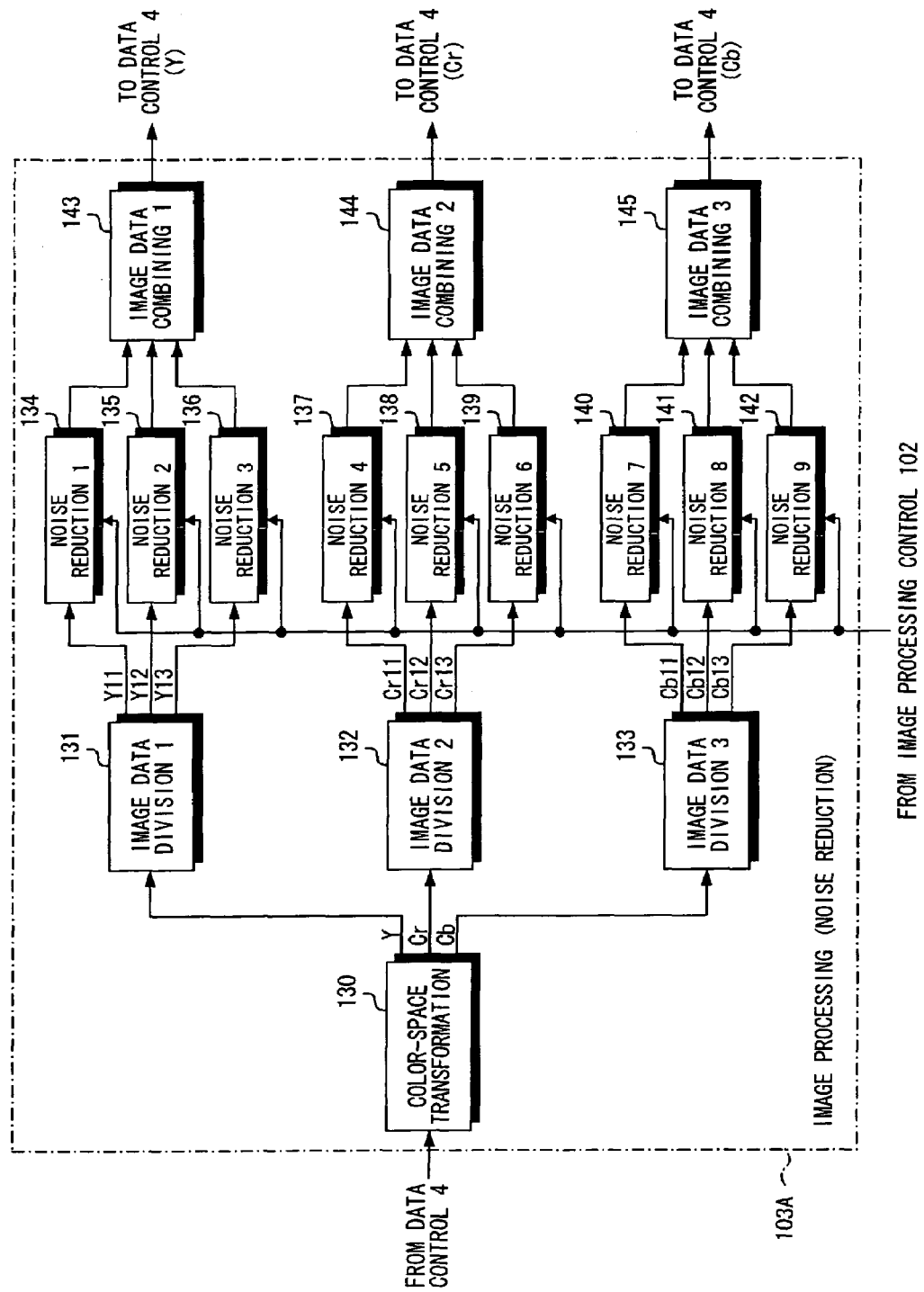
FIG. 14 is a block diagram illustrating the electrical structure of an image processing circuit.

FIG. 14 is a block diagram illustrating the electrical structure of an image processing circuit for performing noise reduction according to a modification of this embodiment.

It will be assumed that the red emphasizing mode has been set by the mode switch 101.

In a manner similar to that described above (see FIG. 6), color image data is converted to luminance data Y and color difference data Cr and Cb by a color-space transforming circuit 130. The luminance data is divided by a first image data dividing circuit 131 into first luminance data Y11 of the low-frequency band, second luminance data Y12 of the low- and intermediate frequency bands and third luminance data Y13 of the low-, intermediate- and high-frequency bands, and the luminance data Y11, Y12 and Y13 is input to a first noise reduction circuit 134, second noise reduction circuit 135 and third noise reduction circuit 136, respectively. Color difference data Cr is divided by a second image data dividing circuit 132 into first color difference data Cr11 of the low-frequency band, second color difference data Cr12 of the low- and intermediate frequency bands and third color difference data Cr13 of the low-, intermediate- and high-frequency bands, and the color difference data Cr11, Cr12 and Cr13 is input to a fourth noise reduction circuit 137, fifth noise reduction circuit 138 and sixth noise reduction circuit 138, respectively. Color difference data Cb is divided by a third image data dividing circuit 133 into first color difference data Cb11 of the low-frequency band, second color difference data Cb12 of the low- and intermediate frequency bands and third color difference data Cb13 of the low-, intermediate- and high-frequency bands, and the color difference data Cb11, Cb12 and Cb13 is input to a seventh noise reduction circuit 140, eighth noise reduction circuit 141 and ninth noise reduction circuit 142, respectively.

Parameters conforming to respective ones of the first to ninth noise reduction circuits 134 to 142 are applied to these noise reduction circuits from the image processing control circuit 102. In a case where the camera has been set to the red emphasizing mode by the mode switch 101, parameters are decided by the image processing control circuit 102 so as to suppress noise in the image data of the red-color component. That is, parameters applied to the fourth to sixth noise reduction circuits 137 to 139 are decided in such a manner that noise will be suppressed to a greater extent than with the parameters applied to the other noise reduction circuits 134 to 136 and 140 to 142.

The output luminance data Y from the first to third noise reduction circuits 134 to 136 is applied to a first image data combining circuit 143, which produces luminance data Y representing one frame of an image. The output color difference data Cr from the fourth to sixth noise reduction circuits 137 to 139 is applied to a second image data combining circuit 144, which produces color difference data Cr representing one frame of an image. The output color difference data Cb from the seventh to ninth noise reduction circuits 140 to 142 is applied to a third image data combining circuit 145, which produces color difference data Cb representing one frame of an image.

Thus, the degree of noise reduction processing can be changed for every color component in accordance with image information (of which the set mode is one example).

Figure 15:
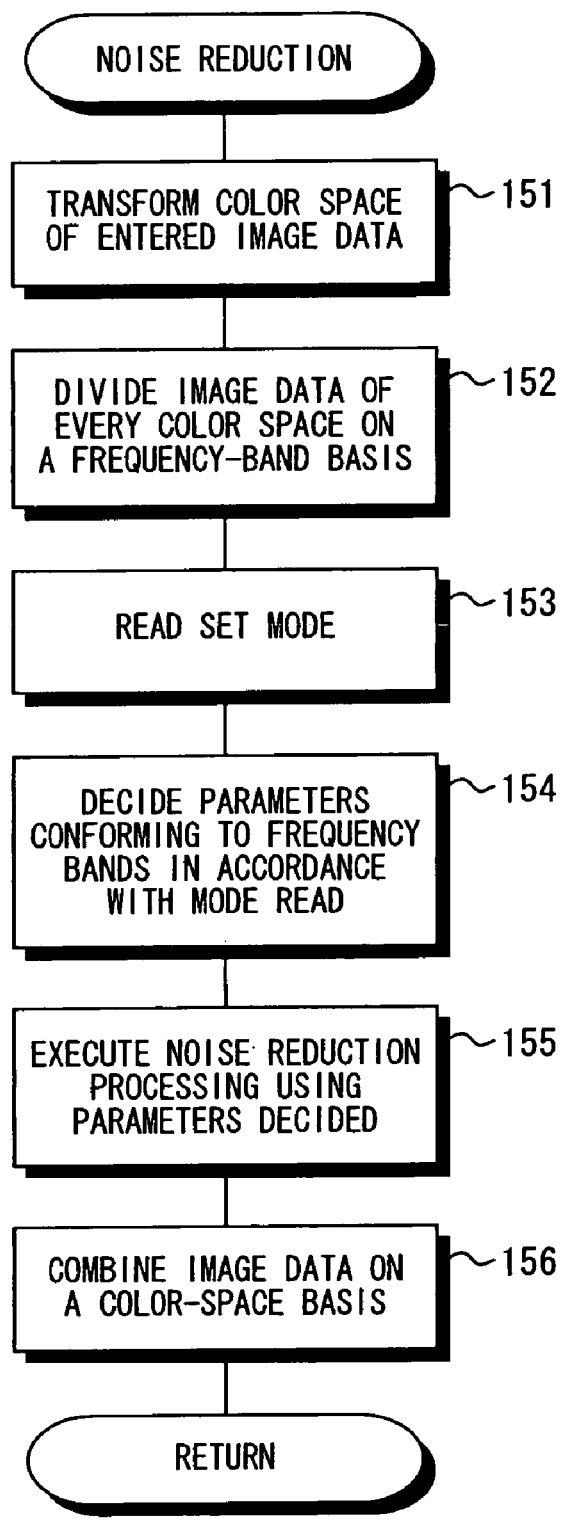
FIG. 15 is a flowchart illustrating noise reduction processing.

FIG. 15 is a flowchart illustrating the procedure of noise reduction processing.

First, the color space of the entered color image data is transformed (step 151). Image data for every color space is divided on a frequency band basis (step 152).

Next, the mode that has been set is read (step 153) and parameters conforming to the frequency bands are decided in accordance with the read mode (step 154). Noise reduction processing of the image data is executed for every color component and every frequency band using the decided parameters (step 155). The image data that has undergone noise reduction is combined on a color-space basis so as to obtain one frame of an image (156).

Figure 16:
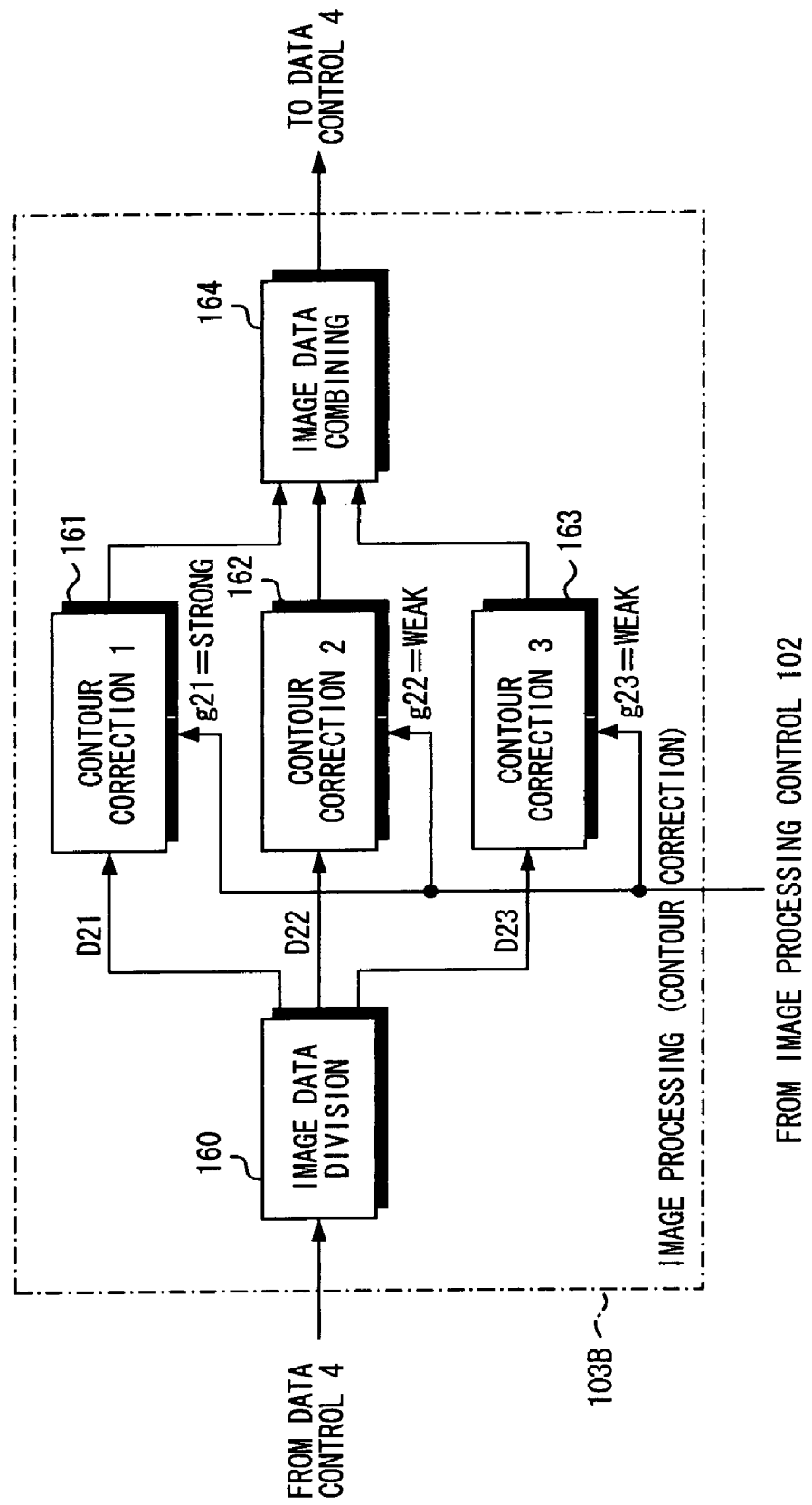
FIGS. 16 and 17 are block diagrams illustrating the electrical structures of image processing circuits.

FIG. 16 is a block diagram illustrating the electrical structure of an image processing circuit for performing a contour correction according to another embodiment of the present invention. It will be assumed that the text mode has been selected by the mode switch 101.

The image data is divided by an image data dividing circuit 160 into first image data D21 of low-frequency components, second image data D22 of intermediate-frequency components and third image data D23 of high-frequency components (see FIG. 9). The items of first image data D21, second image data D22 and third image data D23 are input to a first contour correction circuit 161, second contour correction circuit 162 and third contour correction circuit 163, respectively.

Parameters have been applied to the first contour correction circuit 161, second contour correction circuit 162 and third contour correction circuit 163 from the image processing control circuit 102. In a case where the camera has been set to the text mode, it is preferred that the text have a sharp and clear appearance and therefore the parameters are set in such a manner that contour will be emphasized with regard to contour image data containing low-frequency components. That is, a parameter g21 applied to the first contour correction circuit 161 is made stronger than parameters g22 and g23 applied to the second and third first contour correction circuits 162 and 163, respectively.

The contour image data output from the first, second and third contour correction circuits 161, 162 and 163 is input to an image data combining circuit 164 and is combined thereby so as to represent one frame of an image.

Thus, an appropriate contour correction can be executed for every frequency in accordance with image information (the mode that has been set).

Figure 17:
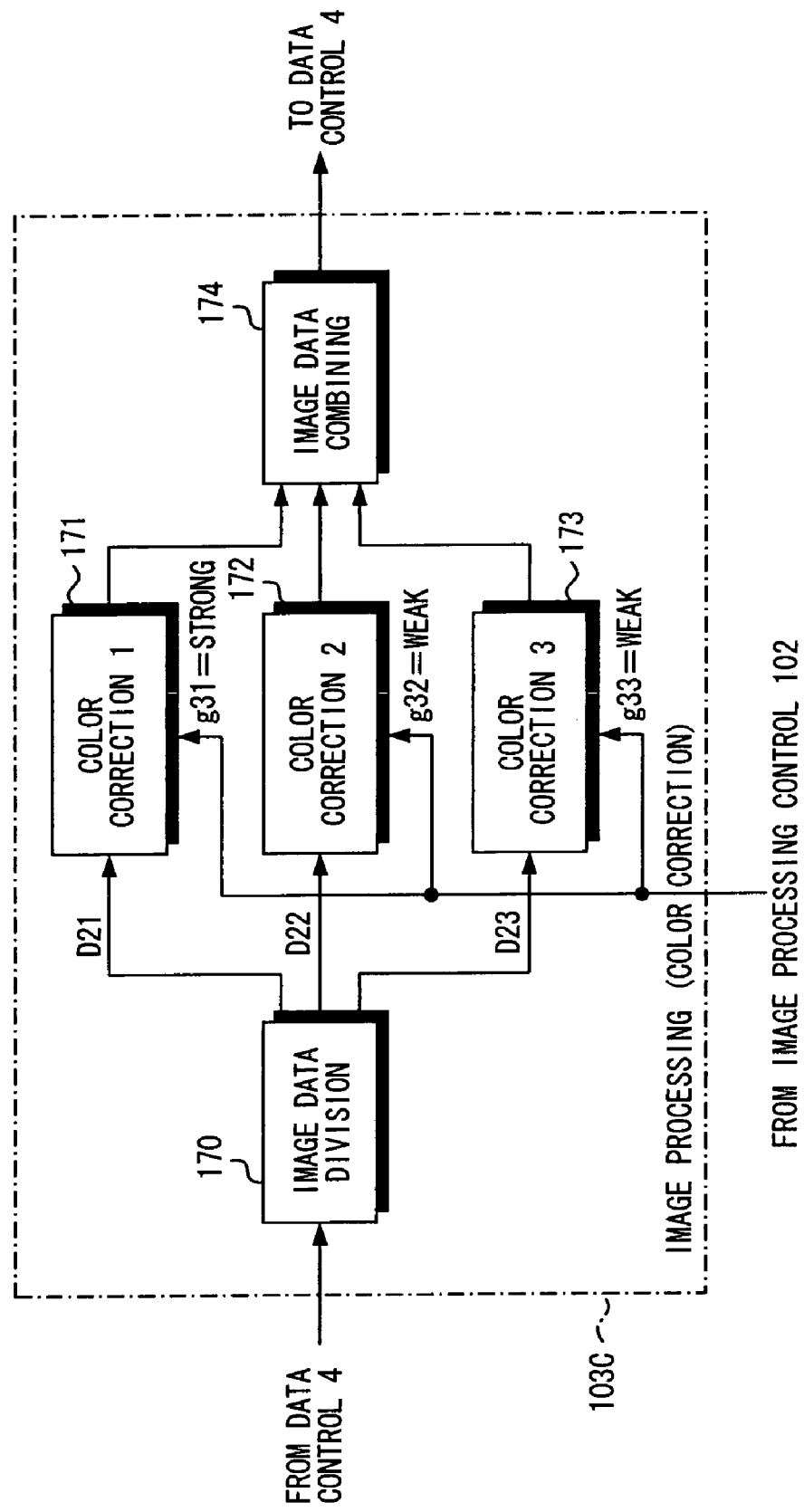

FIG. 17 is a block diagram illustrating the electrical structure of an image processing circuit for performing a color correction according to another embodiment of the present invention. It will be assumed that the color emphasizing mode has been selected by the mode switch 101.

In this case also, in a manner similar to that of the contour correction described above, image data is divided by an image data dividing circuit 170 into first image data D11 of low-frequency components, second image data D12 of intermediate-frequency components and third image data D13 of high-frequency components. The items of first image data D11, second image data D12 and third image data D13 are input to a first color correction circuit 171, second color correction circuit 172 and third color correction circuit 173, respectively.

Parameters have been applied to the first color correction circuit 171, second color correction circuit 172 and third color correction circuit 173 from the image processing control circuit 102. These parameters have been set in such a manner that a strong color correction is performed in the first color correction circuit 171 and a weak color correction in the second and third color correction circuits 172 and 173.

The output image data output from the first, second and third color correction circuits 171 to 173 is input to an image data combining circuit 174 that produces image data representing one frame of an image.

Figure 18:
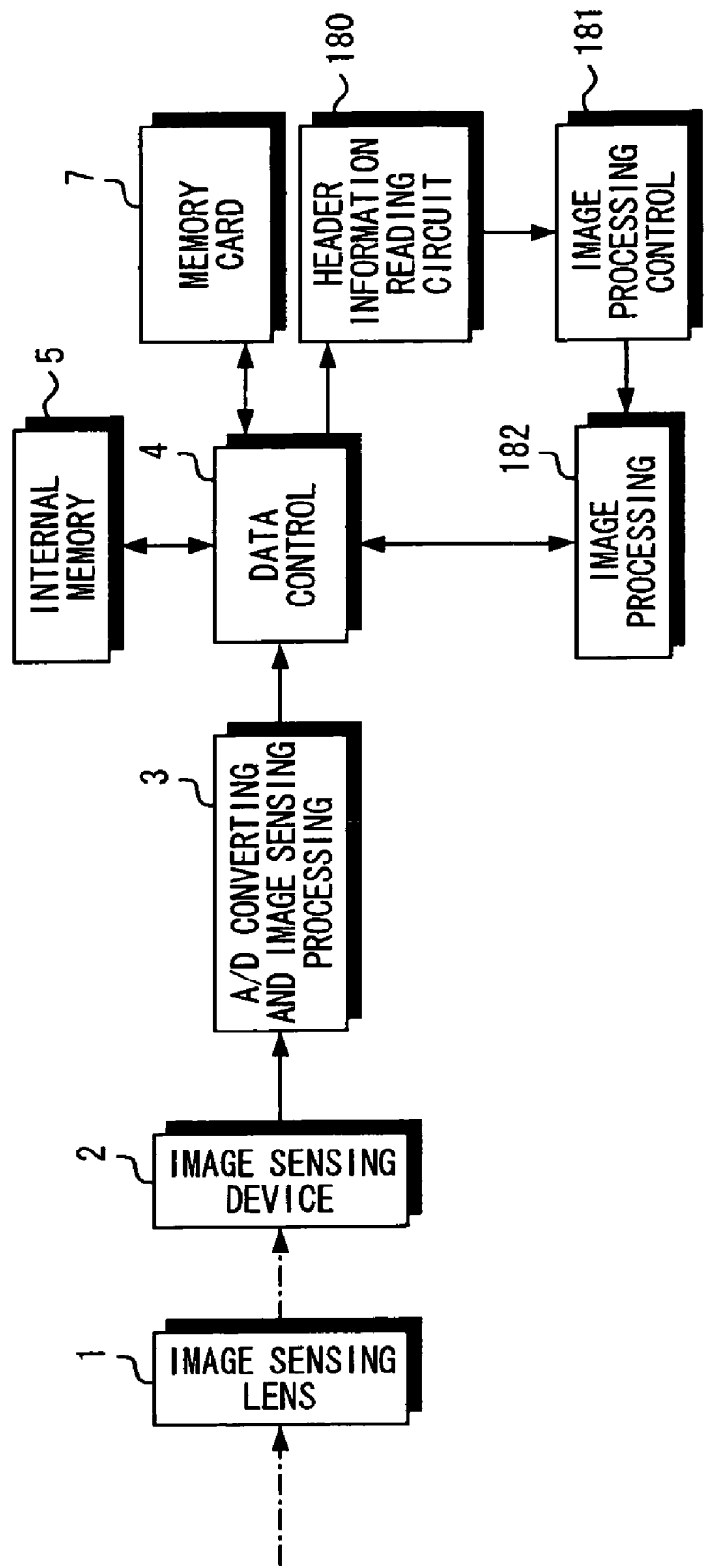
FIG. 18 is a block diagram illustrating the electrical structure of a digital still camera.
Figure 19:
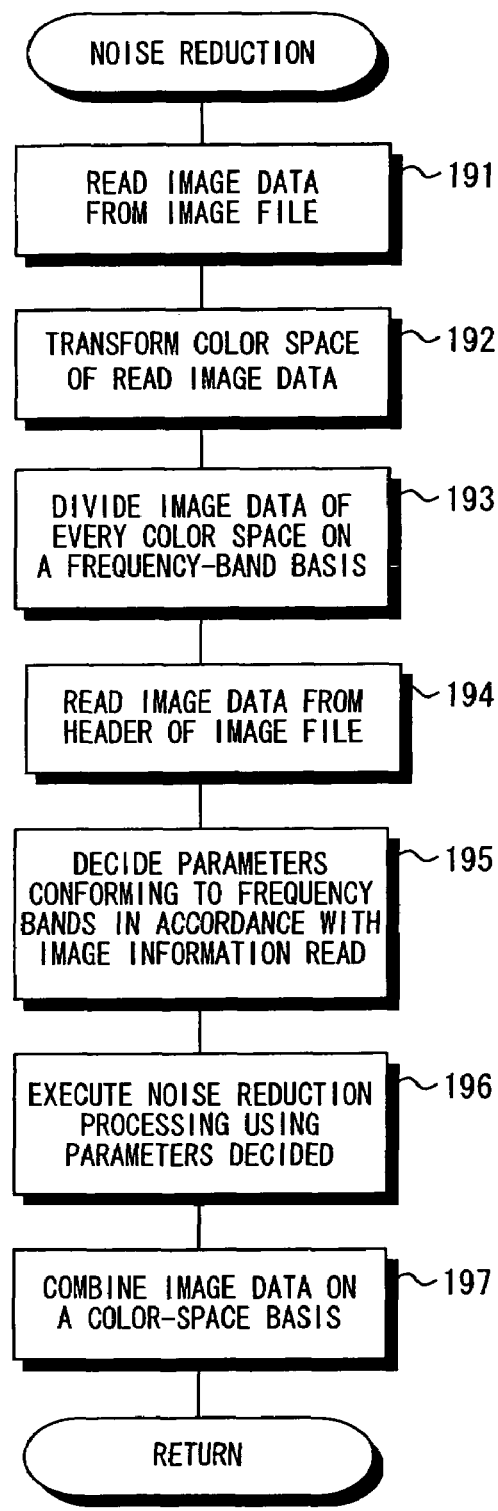
FIG. 19 is a flowchart illustrating noise reduction processing.

FIGS. 18 and 19 illustrate another embodiment of the present invention.

FIG. 18 is a block diagram illustrating the electrical structure of a digital still camera, in which components identical with those shown in FIG. 1 are designated by like reference characters.

In the digital still camera according to this embodiment, image data has been recorded in an image data recording area of an image file stored on the memory card 7. Further, image information concerning the image data has been recorded in a header recording area of the image file. The image data and image information are read from the memory card 7 and the image data is subjected to image processing in accordance with the read image information.

The memory card 7 contains an image file. Further, the digital still camera is provided with a header information reading circuit 180 for reading header information that has been recorded in the header recording area of the image file stored on the memory card 7. If a command for reading a specific image file is applied to the digital still camera, this image file is read from the memory card 7. The header information that has been recorded in the header recording area of the read image file is read by the header information reading circuit 180. Image information is extracted from the read header information and the extracted image information is applied to an image processing control circuit 181. Image information is extracted from the read header information and the extracted image information is applied to the image processing control circuit 181.

Based upon the image information provided by the header information reading circuit 180, parameters used in image processing executed by an image processing circuit 182 are decided for every frequency band by the image processing control circuit 181. The decided parameters are applied to the image processing circuit 182 and appropriate image processing is executed for every frequency band. This is similar to the operation described above in which parameters used in the image processing circuit 103 are decided by the image processing control circuit 102 in accordance with the mode selected by the mode switch 101.

By way of example, assume a case where the image processing circuit 182 is one that executes noise reduction processing (the circuit would have a structure the same as that shown in FIG. 12). If the image information that has been read from the information recording area of an image file indicates that the image data was obtained with the zoom position on the telephoto side, then it is very likely that the image represented by this image data will be out of focus because the zoom lens is on the telephoto side. The parameters g11, g12 and g13, therefore, would be decided so as to reduce the noise in the luminance data Y.

Further, assume a case where the image processing circuit 182 is one that executes contour correction processing (the circuit would have a structure the same as that shown in FIG. 16). If the image information that has been read from the information recording area of an image file indicates that the image data was obtained with the zoom position on the telephoto side, then it is very likely that the image represented by this image data will be out of focus because the zoom lens is on the telephoto side. The contour correction parameters g21, g22 and g23, therefore, would be decided in such a manner that the contour image data D11 having low-frequency components is emphasized more than the other items of contour image data D12 and D13.

Furthermore, assume a case where the image processing circuit 182 is one that executes color correction processing (the circuit would have a structure the same as that shown in FIG. 17). If the image information that has been read from the information recording area of an image file indicates that the image data was obtained in the red emphasizing mode, then the color correction parameters g21, g22 and g23 are decided in such a manner that the color image data D11 having low-frequency components is emphasized more than the other items of color image data D12 and D13. As a result, noise can be prevented from being emphasized.

Furthermore, assume a case where contour emphasis is performed in an instance where color image data has been recorded in the image data recording area of an image file and the image processing circuit 182 is one that divides image data on a color-space basis, (for example, although contour correction is performed instead of noise reduction in the arrangement of FIG. 14, it goes without saying that the arrangement can also be applied to noise reduction and color correction). If the image information that has been read from the information recording area of an image file indicates that the image data was obtained with the zoom position on the telephoto side, then it is very likely that the image represented by this image data will be out of focus because the zoom lens is on the telephoto side. Accordingly, the parameters would be decided in such a manner that the luminance data Y is emphasized from that the color difference data Cr and Cb.

FIG. 19 is a flowchart illustrating a processing procedure for executing noise reduction processing conforming to color space and frequency band using image information that has been recorded in the header recording area of an image file stored on a memory card.

First, image data is read from the image file stored on the memory card (step 191) and the color space of the read image data is transformed (step 192). The image data of every color space obtained by transformation is divided on a frequency-band basis (step 193). Next, image information is read from the header recording area of the image file (step 194).

Based upon the read image information, the parameters conforming to the frequency bands are decided (step 195). Appropriate noise reduction processing is executed for every frequency band using the parameters decided (step 196). Combining processing is executed on a color-space basis in such a manner that the image data that has undergone noise reduction processing becomes one frame of an image (step 197).

Though the above-described embodiments are implemented using hardware, it goes without saying that the embodiments can be implemented using software.

As many apparently widely different embodiments of the present invention can be made without departing from the spirit and scope thereof, it is to be understood that the invention is not limited to the specific embodiments thereof except as defined in the appended claims.

What is claimed is:

1. A noise reduction apparatus comprising:
   an image data dividing device for dividing one frame of applied image data into a first image data having low-frequency bands, a second image data having low and intermediate-frequency bands and a third image data having low, intermediate and high-frequency bands;
   a first noise reduction processing circuit executing noise reduction processing of the first image data;
   a second noise reduction processing circuit executing noise reduction processing of the second image data;
   a third noise reduction processing circuit executing noise reduction processing of the third image data; and
   an image combining device for combining the first image data outputted from said first noise reduction processing circuit, the second image data outputted from said second noise reduction processing circuit and the third image data outputted from said third noise reduction processing circuit, in such a manner that the first, second and third image data will represent one frame of an image,
   wherein the noise reduction processing in the first noise reduction circuit and the noise reduction processing in the third noise reduction circuit are weaker than the noise reduction processing in the second noise reduction circuit.

2. The apparatus according to claim 1, wherein said image data dividing device divides the image data into a plurality of items of image data so as to include image data that maintains the frequency band of the one frame of image data applied thereto.

3. The apparatus according to claim 1, wherein said image data dividing device divides the image data into a plurality of items of image data so as to have different frequency bands in such a manner that one frequency band from among the frequency bands of the plurality of items of image data obtained by division will be included in another frequency band.

4. The apparatus according to claim 1, further comprising:
   a reading device for reading the image data and image information from the memory device.

5. The apparatus according to claim 1, wherein the one frame of applied image data is color image data having a plurality of color components, and said image data dividing device divides the image data into a plurality of items of image data so as to have a different frequency band for every color component.

6. An automated noise reduction method for image data stored in an image file in a memory device, comprising the steps of:
   dividing one frame of an applied image data into a first image data having low-frequency bands, a second image data having low and intermediate-frequency bands and a third image data having low, intermediate and high-frequency bands;
   providing a first noise reduction processing circuit executing noise reduction processing of the first image data with the first noise reduction processing circuit;
   providing a second noise reduction processing circuit;
   executing noise reduction processing of the second image data with the second noise reduction processing circuit;
   providing a third noise reduction processing circuit;
   executing noise reduction processing of the third image data with the third noise reduction processing circuit; and
   combining the first image data outputted from said first noise reduction processing circuit, the second image data outputted from said second noise reduction processing circuit and the third image data outputted from said third noise reduction processing circuit in such a manner that the first, second and third image data will represent one frame of an image,
   wherein the noise reduction processing in the first noise reduction circuit and the noise reduction processing in the third noise reduction circuit are weaker than the noise reduction processing in the second noise reduction circuit.

7. A computer program product comprising a computer readable storage medium, having encoded thereon computer readable program instructions executable by a computer that cause the computer to carry out noise reduction for image data stored in an image file in a memory device by performing the steps of:

dividing one frame of applied image data into a first image data having low-frequency bands, a second image data having low and intermediate-frequency bands and a third image data having low, intermediate and high-frequency bands;

executing noise reduction processing of the first image data with a first noise reducing circuit;

executing noise reduction processing of the second image data with a second noise reduction processing circuit;

executing noise reduction processing of the third image data with a third noise reduction processing circuit; and combining the first image data outputted from said first noise reduction processing circuit, the second image data outputted from said second noise reduction processing circuit and the third image data outputted from said third noise reduction processing circuit in such a manner that the first, second and third image data will represent one frame of an image, wherein the noise reduction processing in the first noise reduction circuit and the noise reduction processing in the third noise reduction circuit are weaker than the noise reduction processing in the second noise reduction circuit.

8. The apparatus according to claim 1, wherein said image data dividing device divides the image data into a plurality of items of image data so as to have different frequency bands in such a manner that one frequency band from among the frequency bands of the plurality of items of image data obtained by division will not be included in another frequency band.

* * * * *